United States Patent
Hamakubo et al.

(10) Patent No.: US 11,960,115 B2
(45) Date of Patent: Apr. 16, 2024

(54) OPTICAL FIBER

(71) Applicant: SUMITOMO ELECTRIC INDUSTRIES, LTD., Osaka (JP)

(72) Inventors: Katsushi Hamakubo, Osaka (JP); Kazuyuki Sohma, Osaka (JP); Tatsuya Konishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 611 days.

(21) Appl. No.: 17/259,070

(22) PCT Filed: Apr. 30, 2020

(86) PCT No.: PCT/JP2020/018344
§ 371 (c)(1),
(2) Date: Jan. 8, 2021

(87) PCT Pub. No.: WO2020/255570
PCT Pub. Date: Dec. 24, 2020

(65) Prior Publication Data
US 2021/0157049 A1    May 27, 2021

(30) Foreign Application Priority Data
Jun. 18, 2019   (JP) .................................. 2019-112621

(51) Int. Cl.
*G02B 6/02*       (2006.01)
*C03C 25/1065*    (2018.01)
(Continued)

(52) U.S. Cl.
CPC ...... *G02B 6/02395* (2013.01); *C03C 25/1065* (2013.01); *C03C 25/24* (2013.01); *C03C 25/47* (2018.01); *C08F 2/48* (2013.01)

(58) Field of Classification Search
None
See application file for complete search history.

(56) References Cited

U.S. PATENT DOCUMENTS 4,525,026 A * 6/1985 Elion ................. H01B 7/28
                                                  385/128
6,907,175 B2 * 6/2005 Suzuki ............. C09D 133/14
                                                  385/127
(Continued)

FOREIGN PATENT DOCUMENTS

EP    3 783 409 A1    2/2021
GB    2582075 A       9/2020
(Continued)

OTHER PUBLICATIONS

Shiue, J. et al., "Effects of silica nanoparticle addition to the secondary coating of dual-coated optical fibers," Acta Materialia, pp. 2631-2636, Jun. 2006.

*Primary Examiner* — Rhonda S Peace
(74) *Attorney, Agent, or Firm* — Faegre Drinker Biddle & Reath LLP

(57) ABSTRACT

An optical fiber comprises a glass fiber comprising a core and a cladding, and a coating resin layer covering the outer periphery of the glass fiber, wherein the average linear expansion coefficient of the coating resin layer at −50° C. or more and 0° C. or less is $3.3 \times 10^{-5}$/° C. or more and less than $9.0 \times 10^{-5}$/° C.

13 Claims, 1 Drawing Sheet

(51) Int. Cl.
*C03C 25/24* (2018.01)
*C03C 25/47* (2018.01)
*C08F 2/48* (2006.01)

(56) References Cited

U.S. PATENT DOCUMENTS

| | | | |
|---|---|---|---|
| 8,639,077 B2 * | 1/2014 | Tanaka | G02B 6/4482 |
| | | | 385/128 |
| 2006/0088263 A1 * | 4/2006 | Tanaka | C03C 25/1065 |
| | | | 385/128 |
| 2012/0321265 A1 | 12/2012 | Terruzzi et al. | |

FOREIGN PATENT DOCUMENTS

| | | |
|---|---|---|
| JP | H2-069706 A | 3/1990 |
| JP | 2000-007717 A | 1/2000 |
| JP | 2004-204206 A | 7/2004 |
| JP | 2009-510520 A | 3/2009 |
| JP | 2010-511770 A | 4/2010 |
| WO | WO-2007/040947 A1 | 4/2007 |
| WO | WO-2008/069656 A1 | 6/2008 |
| WO | WO-2019/116967 A1 | 6/2019 |

\* cited by examiner

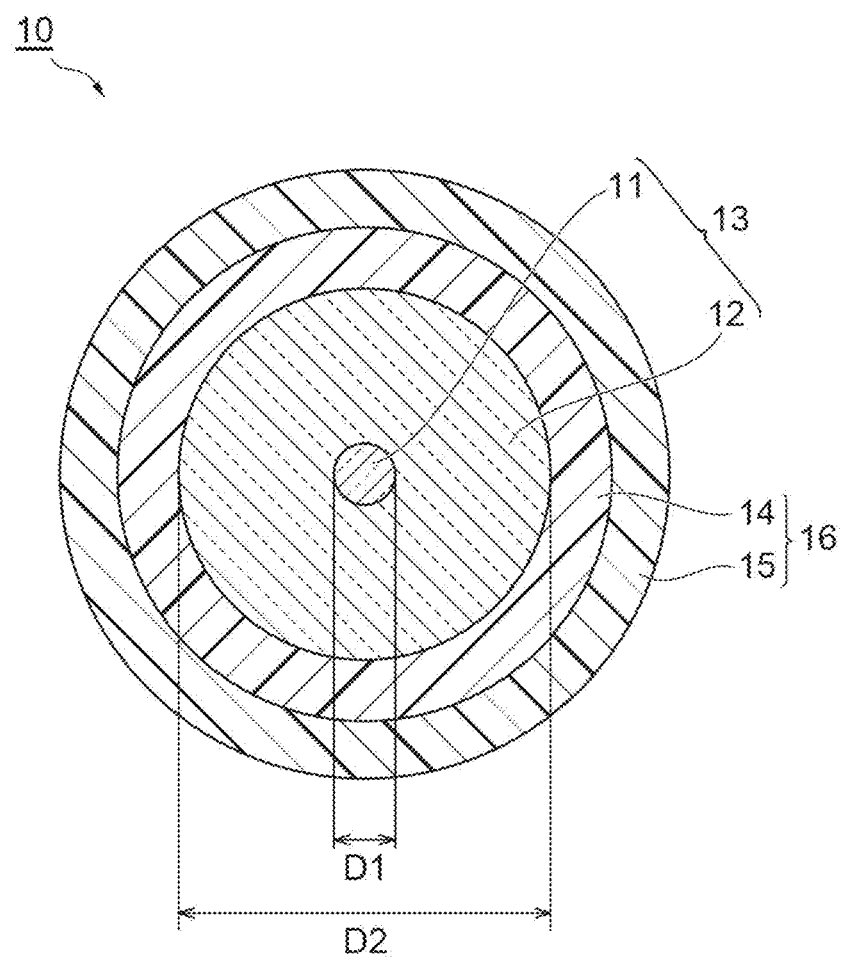

OPTICAL FIBER

TECHNICAL FIELD

The present disclosure relates to an optical fiber.

This application claims priority based on Japanese Patent Application No. 2019-112621 filed on Jun. 18, 2019, and incorporates all the contents described in the Japanese application.

BACKGROUND ART

An optical fiber has generally a coating resin layer for protecting a glass fiber that is an optical transmission medium. The coating resin layer is composed of, for example, a primary resin layer and a secondary resin layer. In order to reduce an increase in transmission loss induced by micro-bend generated when lateral pressure is applied to the optical fiber, the optical fiber has been required to improve lateral pressure characteristics.

For example, in Patent Literature 1, it is investigated to reduce the bending loss of the optical fiber by increasing the Young's modulus of the secondary resin layer (second coating).

CITATION LIST

Patent Literature

[Patent Literature 1] JP 2009-510520 A

SUMMARY OF INVENTION

An optical fiber according to an aspect of the present disclosure comprises a glass fiber comprising a core and a cladding, and a coating resin layer covering the outer periphery of the glass fiber, wherein the average linear expansion coefficient of the coating resin layer at $-50°$ C. or more and $0°$ C. or less is $3.3 \times 10^{-5}/°$ C. or more and less than $9.0 \times 10^{-5}/°$ C.

BRIEF DESCRIPTION OF DRAWING

FIG. 1 is a schematic cross-section diagram showing an example of the optical fiber according to the present embodiment.

DESCRIPTION OF EMBODIMENTS

Problem to be Solved by the Present Disclosure

Optical fibers are used in various environments and require various environmental resistances. Particularly, an optical fiber having a small transmission loss in a low temperature environment, that is, an optical fiber having excellent low temperature characteristics has been required. It is important to increase the Young's modulus of the secondary resin layer in order to improve the lateral pressure characteristics, but it is difficult to reduce the transmission loss in a low temperature environment only by increasing the Young's modulus of the secondary resin layer.

An object of the present disclosure is to provide an optical fiber having excellent low temperature characteristics.

Effect of the Present Disclosure

The present disclosure can provide an optical fiber having excellent low temperature characteristics.

Description of Embodiments of the Present Disclosure

First, the contents of the embodiment of the present disclosure will be described by listing them. An optical fiber according to an aspect of the present disclosure comprises a glass fiber comprising a core and a cladding, and a coating resin layer covering the outer periphery of the glass fiber, wherein the average linear expansion coefficient of the coating resin layer at $-50°$ C. or more and $0°$ C. or less is $3.3 \times 10^{-5}/°$ C. or more and less than $9.0 \times 10^{-5}/°$ C.

Adjusting the average linear expansion coefficient of the coating resin layer can improve the low temperature characteristics of the optical fiber.

The above coating resin layer has a primary resin layer being in contact with the glass fiber and covering the glass fiber, and a secondary resin layer covering the outer periphery of the primary resin layer, wherein the secondary resin layer may comprise a cured product of a resin composition comprising a base resin containing an oligomer comprising urethane (meth)acrylate, a monomer, and a photopolymerization initiator, and hydrophobic inorganic oxide particles. Having such a secondary resin reduces the linear expansion coefficient of the coating resin layer, and easily improves the low temperature characteristics of the optical fiber.

Due to easy formation of a secondary resin layer having an excellent balance between Young's modulus and linear expansion coefficient, the content of the inorganic oxide particles may be 1.5% by mass or more and less than 65% by mass based on the total amount of the resin composition.

Due to excellent dispersion properties in the resin composition and easy adjustment of Young's modulus, the inorganic oxide particles may be particles including at least one selected from the group consisting of silicon dioxide, zirconium dioxide, aluminum oxide, magnesium oxide, titanium oxide, tin oxide, and zinc oxide. Due to easy reduction of the linear expansion coefficient of the coating resin layer, the inorganic oxide particles may have an ultraviolet curable functional group. Due to easy formation of a resin layer with a high Young's modulus, the ultraviolet curable functional group may be a (meth)acryloyl group.

Detail of Embodiment of the Present Disclosure

Specific examples of a resin composition and an optical fiber according to the present embodiments will be described referring to the drawing as necessary. The present invention is not limited to these illustrations but is indicated by the claims and intended to include meanings equivalent to the claims and all modifications within the claims. In the following description, the same reference numerals are given to the same elements in the description of the drawing, and redundant explanations are omitted.

<Optical Fiber>

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica glass or pure silica glass can be used, for example, in the core 11, and pure silica glass or fluorine-added silica glass can be used in the cladding 12.

In FIG. 1, for example, the outside diameter (D2) of the glass fiber 13 is about 100 μm to 125 μm, and the diameter (D1) of the core 11 constituting the glass fiber 13 is about 7 μm to 15 μm. The thickness of the coating resin layer 16 is typically about 22 μm to 70 μm. The thickness of each of the primary resin layer 14 and the secondary resin layer 15 may be about 5 μm to 50 μm.

When the outside diameter (D2) of the glass fiber 13 is about 125 μm and the thickness of the coating resin layer 16 is 60 μm or more and 70 μm or less, the thickness of each of the primary resin layer 14 and the secondary resin layer 15 may be about 10 μm to 50 μm, and for example, the thickness of the primary resin layer 14 may be 35 μm and the thickness of the secondary resin layer 15 may be 25 μm. The outside diameter of the optical fiber 10 may be about 245 μm to 265 μm.

When the outside diameter (D2) of the glass fiber 13 is about 125 μm and the thickness of the coating resin layer 16 is 27 μm or more and 48 μm or less, the thickness of each of the primary resin layer 14 and the secondary resin layer 15 may be about 10 μm to 38 μm, and for example, the thickness of the primary resin layer 14 may be 25 μm and the thickness of the secondary resin layer 15 may be 10 μm. The outside diameter of the optical fiber 10 may be about 179 μm to 221 μm.

When the outside diameter (D2) of the glass fiber 13 is about 100 μm and the thickness of the coating resin layer 16 is 22 μm or more and 37 μm or less, the thickness of each of the primary resin layer 14 and the secondary resin layer 15 may be about 5 μm to 32 μm, and for example, the thickness of the primary resin layer 14 may be 25 μm and the thickness of the secondary resin layer 15 may be 10 μm. The outside diameter of the optical fiber 10 may be about 144 μm to 174 μm.

Due to improvement of the low temperature characteristics of the optical fiber, the average linear expansion coefficient of the coating resin layer 16 at −50° C. or more and 0° C. or less is $3.3 \times 10^{-5}/°$ C. or more and less than $9.0 \times 10^{-5}/°$ C., preferably $3.3 \times 10^{-5}/°$ C. or more and $8.9 \times 10^{-5}/°$ C. or less, more preferably $3.4 \times 10^{-5}/°$ C. or more and $8.5 \times 10^{-5}/°$ C. or less, and further preferably $3.5 \times 10^{-5}/°$ C. or more and $8.0 \times 10^{-5}/°$ C. or less.

(Secondary Resin Layer)

From the viewpoint of reducing the linear expansion coefficient of the coating resin layer and improving the low temperature characteristics of the optical fiber, the secondary resin layer 15 can be formed by curing a resin composition comprising a base resin containing an oligomer comprising urethane (meth)acrylate, a monomer, and a photopolymerization initiator, and hydrophobic inorganic oxide particles. That is, the secondary resin layer 15 may include a cured product of a resin composition comprising a base resin containing an oligomer comprising urethane (meth)acrylate, a monomer, and a photopolymerization initiator and hydrophobic inorganic oxide particles.

(Meth)acrylate means an acrylate or a methacrylate corresponding to it. The same applies to (meth)acrylic acid and the like.

(Inorganic Oxide Particles)

The inorganic oxide particles according to the present embodiment are spherical particles and have a surface subjected to hydrophobic treatment. The hydrophobic treatment according to the present embodiment is introduction of a hydrophobic group onto the surface of the inorganic oxide particles. The inorganic oxide particles having a hydrophobic group introduced have excellent dispersibility in the resin composition. The hydrophobic group may be a reactive group (ultraviolet curable functional group) such as a (meth) acryloyl group or a non-reactive group such as an aliphatic hydrocarbon group (for example, an alkyl group) or an aromatic hydrocarbon group (for example, a phenyl group). In the case of the inorganic oxide particles having a reactive group, the resin layer having high Young's modulus is easy to form.

Due to easy formation of the resin layer having reduced linear expansion coefficient, the inorganic oxide particles according to the present embodiment may have an ultraviolet curable functional group. Treating the inorganic oxide particles with a silane compound having an ultraviolet curable functional group can introduce an ultraviolet curable functional group onto the surface of the inorganic oxide particles.

Examples of the silane compound having ultraviolet curable functional groups include 3-methacryloxypropyltrimethoxysilane, 3-acryloxypropyltrimethoxysilane, 3-methacryloxypropyltriethoxysilane, 3-acryloxypropyltriethoxysilane, 8-methacryloxyoctyltrimethoxysilane, 8-acryloxyoctyltrimethoxysilane, 7-octenyltrimethoxysilane, vinyltrimethoxysilane, and vinyltriethoxysilane.

The inorganic oxide particles according to the present embodiment are dispersed in a dispersion medium. Using the inorganic oxide particles dispersed in the dispersion medium allows for uniform dispersion of the inorganic oxide particles in the resin composition and then improvement of the storage stability of the resin composition. The dispersion medium is not particularly limited as long as curing of the resin composition is not obstructed. The dispersion medium may be reactive or non-reactive.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, polytetramethylene glycol di(meth) acrylate, 2-hydroxy-3-phenoxypropyl acrylate, (meth) acrylic acid adduct of propylene glycol diglycidyl ether, (meth)acrylic acid adduct of tripropylene glycol diglycidyl ether, and (meth)acrylic acid adduct of glycerin diglycidyl ether. (Meth)acryloyl compounds exemplified by monomers described below may be used as the dispersion medium.

A ketone solvent such as methyl ethyl ketone (MEK), an alcohol solvent such as methanol (MeOH), or an ester solvent such as propylene glycol monomethyl ether acetate (PGMEA) may be used as a non-reactive dispersion medium. In the case of the non-reactive dispersion medium, the resin composition may be prepared by mixing the base resin and the inorganic oxide particles dispersed in the dispersion medium and removing a part of the dispersion medium.

The inorganic oxide particles dispersed in the dispersion medium remain to be dispersed in the resin layer after curing of the resin composition. When a reactive dispersion medium is used, the inorganic oxide particles are mixed with the dispersion medium in the resin composition and are incorporated in the resin layer with the dispersion condition maintained. When a non-reactive dispersion medium is used, at least a part of the dispersion medium evaporates and disappears from the resin composition, but the inorganic oxide particles remain in the resin composition with the dispersion condition remained and are also present in the cured resin layer with the dispersion condition remained. Electron microscope observation shows that the inorganic oxide particles present in the resin layer are in the condition of dispersion of the primary particle.

Due to excellent dispersion properties in the resin composition and easy formation of a smooth resin layer, it is preferable that the inorganic oxide particles are at least one selected from the group consisting of silicon dioxide (silica), zirconium dioxide (zirconia), aluminum oxide (alumina), magnesium oxide (magnesia), titanium oxide (titania), tin oxide, and zinc oxide. From the view point of excellent inexpensiveness, easy surface treatment, permeability to ultraviolet ray, easy provision of a resin layer with appropriate hardness, and the like, it is more preferable that the hydrophobic silica particles be used as the inorganic oxide particles according to the present embodiment. It is more preferable to use silica particles having ultraviolet curable functional groups.

From the viewpoint of imparting appropriate toughness to the secondary resin layer, the average primary particle size of the inorganic oxide particles may be 500 nm or less, is preferably 200 nm or less, more preferably 100 nm or less, and further preferably 50 nm or less. From the viewpoint of increasing the Young's modulus of the secondary resin layer, the average primary particle size of the inorganic oxide particles is preferably 5 nm or more, and more preferably 10 nm or more. The average primary particle diameter can be measured with image analysis of electron microscope pictures, a light scattering method or a BET method, for example. The dispersion medium in which the primary particle of the inorganic oxide is dispersed appears to be visually transparent when the diameter of the primary particle is small. When the diameter of the primary particle diameter is relatively large (40 nm or more), the dispersion medium in which the primary particle is dispersed appears to be clouded, but the precipitate is not observed.

The content of the inorganic oxide particles is preferably 1.5% by mass or more and less than 65% by mass, more preferably 3% by mass or more and 63% by mass or less, and further preferably 8% by mass or more and 60% by mass or less based on the total amount of the resin composition (total amount of the base resin and inorganic oxide particles). The content of the inorganic oxide particles of 1.5% by mass or more allows easy reduction of the linear expansion coefficient of the coating resin layer. The content of the inorganic oxide particles of less than 65% by mass allows easy improvement in the application properties of the resin composition and formation of a tough resin layer. Since the total amount of the resin composition hardly changes with curing, the total amount of the resin composition may be considered as the total amount of the cured product of the resin composition.

(Base Resin)

A base resin according to the present embodiment contains an oligomer comprising urethane (meth)acrylate, a monomer and a photopolymerization initiator.

As urethane (meth)acrylate, an oligomer obtained by reacting a polyol compound, a polyisocyanate compound, and a hydroxyl group-containing (meth)acrylate compound can be used.

Examples of the polyol compound include polytetramethylene glycol, polypropylene glycol and bisphenol A-ethylene oxide addition diol. The number average molecular weight of the polyol compound may be 400 to 1000. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate.

As a catalyst for synthesizing urethane (meth)acrylate, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the view point of easy availability or catalyst performance, it is preferable that dibutyltin dilaurate or dibutyltin diacetate be used as catalyst.

When urethane (meth)acrylate is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

The base resin may further include epoxy (meth)acrylate as an oligomer. The oligomer obtained by reacting a compound having a (meth)acryloyl group with an epoxy resin having two or more glycidyl groups can be used as an epoxy (meth)acrylate.

At least one selected from the group consisting of the monofunctional monomer having one polymerizable group and the multifunctional monomer having two or more polymerizable groups can be used as the monomer. A monomer may be used by mixing two or more monomers.

Examples of the monofunctional monomer include (meth)acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocycle containing monomers such as N-(meth)acryloyl morpholine, N-vinyl pyrrolidone, N-vinyl caprolactam, N-acryloylpiperidine, N-methacryloylpiperidine, N-(meth)acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide, and N-methylolpropane (meth)acrylamide; aminoalkyl (meth) acrylate monomers such as aminoethyl (meth)acrylate, aminopropyl (meth)acrylate, N, N-dimethylaminoethyl (meth) acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the multifunctional monomer include: monomers having two polymerizable groups such as ethylene glycol di(meth)acrylate, polyethylene glycol di(meth) acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth) acrylate, 1,14-tetradecanediol di(meth)acrylate, 1,16-hexadecanediol di(meth)acrylate, 1,20-eicosanediol di(meth) acrylate, isopentyldiol di(meth)acrylate, 3-ethyl-1,8-octanediol di(meth)acrylate, and EO adduct of bisphenol A di(meth)acrylate; and monomers having three or more polymerizable groups such as trimethylolpropane tri(meth) acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra (meth)acrylate, ditrimethylolpropane tetra(meth)acrylate, dipentaerythritol tetra(meth)acrylate, dipentaerythritol penta (meth)acrylate, dipentaerythritol hexa(meth)acrylate, and caprolactone-modified tris[(meth)acryloyloxyethyl] isocyanurate.

From the viewpoint of increasing the Young's modulus of the resin layer, the monomer preferably includes a multifunctional monomer, and more preferably includes a monomer having two polymerizable groups.

The photopolymerization initiator can be appropriately selected from known radical photopolymerization initiators and used. Examples of the photopolymerization initiator include 1-hydroxycyclohexyl phenyl ketone (Omnirad 184, manufactured by IGM Resins), 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907 manufactured by IGM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by IGM Resins).

The resin composition may further contain a silane coupling agent, a leveling agent, an antifoaming agent, an antioxidant, and a sensitizer, and the like.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropyl benzothiazyl tetrasulfide.

The Young's modulus of the secondary resin layer is preferably 1200 MPa or more and 2800 MPa or less at 23° C., more preferably 1250 MPa or more and 2750 MPa or less, and further preferably 1300 MPa or more and 2700 MPa or less. The Young's modulus of the secondary resin layer of 1200 MPa or more is easy to improve the lateral pressure characteristics, and the Young's modulus of 2800 MPa or less can provide proper toughness to the secondary resin layer, and thus can be easy to improve low temperature characteristics.

(Primary Resin Layer)

The primary resin layer 14 can be formed by curing a resin composition including an oligomer comprising urethane (meth)acrylate, a monomer, a photopolymerization initiator and a silane coupling agent. Prior art techniques can be used for a resin composition for the primary resin layer. Urethane (meth)acrylate, a monomer, a photopolymerization initiator and a silane coupling agent may be appropriately selected from compounds exemplified in the above base resin. The resin composition constituting the primary resin layer has composition different from the base resin forming the secondary resin layer.

From the viewpoint of suppressing the generation of voids in the optical fiber, the Young's modulus of the primary resin layer is preferably 0.04 MPa or more and 1.0 MPa or less at 23° C., more preferably 0.05 MPa or more and 0.9 MPa or less, and further preferably 0.05 MPa or more and 0.8 MPa or less.

EXAMPLES

Hereinafter, the results of evaluation test using Examples and Comparative Examples according to the present disclosure will be shown, and the present disclosure is described in more detail. The present invention is not limited to these examples.

[Resin Composition for a Secondary Resin Layer]

(Oligomer)

As the oligomer, urethane acrylate (UA) obtained by reacting a polypropylene glycol having a molecular weight of 600, 2,4-tolylene diisocyanate, and hydroxyethyl acrylate, and epoxy acrylate (EA) were prepared.

(Monomer)

As the monomer, isobornyl acrylate (trade name "IBXA" of Osaka Organic Chemical Industry Co., Ltd.), tripropylene glycol diacrylate (trade name "TPGDA" of Daicel Ornex Co., Ltd.), and 2-phenoxyethyl acrylate (trade name "Light Acrylate PO-A" of Kyoei Chemical Co., Ltd.) were prepared.

(Photopolymerization Initiator)

As the photopolymerization initiator, 1-hydroxycyclohexyl phenyl ketone (Omnirad 184) and 2,4,6-trimethylbenzoyldiphenylphosphine oxide (Omnirad TPO) were prepared.

(Inorganic Oxide Particles)

Silica sol having hydrophobic silica particles having a methacryloyl group and with an average primary particle size of 10 to 15 nm, dispersed in MEK was prepared as the inorganic oxide particles.

(Resin Composition)

First, a base resin was prepared by mixing the above oligomer, monomer, and photopolymerization initiator. Next, the silica sol was mixed with the base resin so as to have the content of the silica particles shown in Table 1 or Table 2, and then most of MEK as a dispersion medium was removed under reduced pressure to produce resin compositions for the secondary resin layer. The content of remaining MEK in the resin composition was 5% by mass or less.

In Tables 1 and 2, the values of the oligomer and the monomer are the contents based on the total amount of the oligomer and the monomer, and the value of silica particles is the content based on the total amount of the resin composition.

[Resin Composition for the Primary Resin Layer]

A urethane acrylate obtained by reacting polypropylene glycol with a molecular weight of 4000, isophorone diisocyanate, hydroxyethyl acrylate, and methanol was prepared. 75 parts by mass of this urethane acrylate, 12 parts by mass of a nonylphenol EO-modified acrylate, 6 parts by mass of N-vinylcaprolactam, 2 parts by mass of 1,6-hexanediol diacrylate, 1 part by mass of 2,4,6-trimethylbenzoyldiphenylphosphine oxide, and 1 part by mass of 3-mercaptopropyltrimethoxysilane were mixed to obtain a resin composition for the primary resin layer.

[Production of an Optical Fiber]

On the outer periphery of a 125 μm diameter glass fiber composed of a core and cladding, a primary resin layer with a thickness of 35 μm was formed by using a resin composition for the primary resin layer, and a secondary resin layer with a thickness of 25 μm was further formed on the outer periphery thereof by using resin compositions of Examples or Comparative Examples to produce optical fibers. A linear speed was 1500 m/min.

(Young's Modulus of the Primary Resin Layer)

The Young's modulus of the primary resin layer was measured by the Pullout Modulus (POM) method at 23° C. Two parts of an optical fiber were fixed with two chuck devices, a coating resin layer (the primary resin layer and the secondary resin layer) between the two chuck devices was removed, and then one chuck device was fixed and another chuck device was slowly moved in the opposite direction of the fixed device. When the length of the portion sandwiched between the chuck devices to be moved in the optical fiber is L, the amount of movement of the chuck is Z, the outer diameter of the primary resin layer is Dp, the outer diameter of the glass fiber is Df, the Poisson's ratio of the primary resin layer is n, and the load in moving the chuck device is W, the Young's modulus of the primary resin layer was determined from the following formula. The Young's modulus of the primary resin layer was 0.2 MPa.

$$\text{Young's modulus (MPa)} = ((1+n)W/\pi LZ) \times \ln(Dp/Df)$$

(Young's Modulus of the Secondary Resin Layer)

The Young's modulus of the secondary resin layer was determined from 2.5% secant value by using a pipe-shaped coating resin layer (length: 50 mm or more) obtained by taking out a glass fiber from an optical fiber to perform a tensile test (distance between marked lines: 25 mm) in an environment of 23±2° C. and 50±10% RH.

(Linear Expansion Coefficient)

A pipe-shaped coating resin layer obtained by taking out a glass fiber from an optical fiber was used as a sample for measuring the linear expansion coefficient. The linear expansion coefficient of the coating resin layer was measured under the following conditions by using a thermomechanical analyzer ("TMA4000S" manufactured by Bruker AXS GmbH). The data of the temperature T (° C.) was measured from T° C. to T° C.+10° C. in 1° C. increments and averaged to calculate data at 10° C. intervals, and measurement was performed for 3 cycles in the following temperature range, and the average linear expansion coefficient of −50° C. to 0° C. was calculated from the average values in the temperature range for 3 cycles.

Temperature range: −50° C. to 0° C.

Heating rate: 5° C./min

Atmosphere: air

Measurement length: about 15 mm

Measurement mode: tension method

Tension: 0.015 N (Generation of Void)

An optical fiber of 10 m was stored at 85° C. and 85% humidity for 120 days and then left at −40° C. for 16 hours, and the presence or absence of voids with a diameter of 10 μm or more was observed with a microscope. The case where the number of voids per 1 m of the optical fiber was less than 1 was was evaluated as "A", the case where the number of voids was 1 to 2 was evaluated as "B", and the case where the number of voids exceeded 2 was evaluated as "C".

(Lateral Pressure Characteristics)

The transmission loss of light having a wavelength of 1550 nm when the optical fiber was wound into a single layer onto a bobbin with its surface covered with sandpaper and having a diameter of 280 mm was measured by an OTDR (Optical Time Domain Reflectometer) method. In addition, the transmission loss of light having a wavelength of 1550 nm when the optical fiber was wound into a single layer on a bobbin having a diameter of 280 mm without sandpaper was measured by the OTDR method. Difference in the measured transmission loss was obtained and the lateral pressure characteristics was evaluated as "A" when the transmission loss difference was 0.6 dB/km or less, and the lateral pressure characteristics was evaluated as "B" when the transmission loss difference was over 0.6 dB/km.

(Low Temperature Characteristics)

An optical fiber was wound around a glass bobbin with a tension of 50 g in a single layer, and the transmission characteristics of signal light having a wavelength of 1550 nm were measured under the respective temperature conditions of 23° C. and −40° C. to determine the transmission loss at 23° C. and −40° C. The case where the transmission loss difference obtained by subtracting the transmission loss at 23° C. from the transmission loss at −40° C. was less than 0 dB was evaluated as "A", the case of 0 dB or more and less than 0.01 dB/km was evaluated as "B", and the case of 0.01 dB/km or more was evaluated as "C".

TABLE 1

| Example | | 1 | 2 | 3 | 4 | 5 |
|---|---|---|---|---|---|---|
| Oligomer (% by mass) | UA | 50 | 50 | 50 | 50 | 50 |
| | EA | 10 | 10 | 10 | 10 | 10 |
| Monomer (% by mass) | IBXA | 10 | 10 | 10 | 10 | 10 |
| | TPGDA | 13 | 13 | 13 | 13 | 13 |
| | POA | 17 | 17 | 17 | 17 | 17 |
| Silica particles (% by mass) | | 5 | 18 | 30 | 40 | 60 |
| Young's modulus (MPa) | | 1300 | 1600 | 1900 | 1600 | 2700 |
| Generation of void | | A | A | A | A | A |
| Lateral pressure characteristics | | A | A | A | A | A |
| Linear expansion coefficient ($\times 10^{-5}/°$ C.) | | 8.8 | 7.6 | 6.6 | 5.7 | 4.0 |
| Low temperature characteristics | | B | A | A | A | A |

TABLE 2

| Comparative Example | | 1 | 2 | 3 |
|---|---|---|---|---|
| Oligomer (% by mass) | UA | 50 | 30 | 50 |
| | EA | 10 | 35 | 10 |
| Monomer (% by mass) | IBXA | 10 | 8 | 10 |
| | TPGDA | 13 | 12 | 13 |
| | POA | 17 | 15 | 17 |
| Silica particles (% by mass) | | 1 | — | 65 |
| Young's modulus (MPa) | | 1150 | 1600 | 3000 |
| Generation of void | | A | C | B |
| Lateral pressure characteristics | | A | A | A |
| Linear expansion coefficient ($\times 10^{-5}/°$ C.) | | 9.2 | 9.0 | 3.0 |
| Low temperature characteristics | | C | C | C |

REFERENCE SIGNS LIST

10: Optical fiber, 11: Core, 12: Cladding, 13: Glass fiber, 14: Primary resin layer, 15: Secondary resin layer, 16: Coating resin layer.

The invention claimed is:

1. An optical fiber comprising:
    a glass fiber comprising a core and a cladding; and
    a coating resin layer covering the outer periphery of the glass fiber,
    wherein an average linear expansion coefficient of the coating resin layer at −50° C. or more and 0° C. or less is $3.3 \times 10^{-5}/°$ C. or more and less than $9.0 \times 10^{-5}/°$ C.,
    wherein the coating resin layer has a primary resin layer being in contact with the glass fiber and covering the glass fiber and a secondary resin layer covering an outer periphery of the primary resin layer,
    the secondary resin layer comprises a cured product of a resin composition comprising a base resin containing an oligomer comprising urethane (meth)acrylate, a monomer, and a photopolymerization initiator, and hydrophobic inorganic oxide particles, and
    wherein a content of the inorganic oxide particles is 3% by mass or more and less than 65% by mass based on a total amount of the resin composition.

2. The optical fiber according to claim 1, wherein a content of the inorganic oxide particles is 8% by mass or more and 60% by mass or less based on a total amount of the resin composition.

3. The optical fiber according to claim 2 wherein the inorganic oxide particles are at least one selected from the group consisting of silicon dioxide, zirconium dioxide, aluminum oxide, magnesium oxide, titanium oxide, tin oxide, and zinc oxide.

4. The optical fiber according to claim 3, wherein the inorganic oxide particles have an ultraviolet curable functional group.

5. The optical fiber according to claim 4, wherein the ultraviolet curable functional group is a (meth)acryloyl group.

6. The optical fiber according to claim 2, wherein the inorganic oxide particles have an ultraviolet curable functional group.

7. The optical fiber according to claim 6, wherein the ultraviolet curable functional group is a (meth)acryloyl group.

8. The optical fiber according to claim 1, wherein the inorganic oxide particles are at least one selected from the group consisting of silicon dioxide, zirconium dioxide, aluminum oxide, magnesium oxide, titanium oxide, tin oxide, and zinc oxide.

9. The optical fiber according to claim 8, wherein the inorganic oxide particles have an ultraviolet curable functional group.

10. The optical fiber according to claim 9, wherein the ultraviolet curable functional group is a (meth)acryloyl group.

11. The optical fiber according to claim 1, wherein the inorganic oxide particles have an ultraviolet curable functional group.

12. The optical fiber according to claim 11, wherein the ultraviolet curable functional group is a (meth)acryloyl group.

13. The optical fiber according to claim 11, wherein the ultraviolet curable functional group is a (meth)acryloyl group.

* * * * *